US011385160B2

(12) United States Patent
Cha et al.

(10) Patent No.: US 11,385,160 B2
(45) Date of Patent: Jul. 12, 2022

(54) SYSTEM AND METHOD FOR DYNAMIC MEASUREMENT OF STREAMING POTENTIAL IN A CORE PLUG

(71) Applicant: SAUDI ARABIAN OIL COMPANY, Dhahran (SA)

(72) Inventors: Dong Kyu Cha, Dhahran (SA); Subhash C. Ayirala, Dhahran (SA); Ali Abdullah Al-Yousef, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 219 days.

(21) Appl. No.: 16/804,564

(22) Filed: Feb. 28, 2020

(65) Prior Publication Data
US 2021/0270714 A1 Sep. 2, 2021

(51) Int. Cl.
*G01N 15/08* (2006.01)
*G01N 1/28* (2006.01)
*G01N 27/08* (2006.01)

(52) U.S. Cl.
CPC .......... *G01N 15/0826* (2013.01); *G01N 1/28* (2013.01); *G01N 27/08* (2013.01)

(58) Field of Classification Search
CPC .............................. G01N 1/28; G01N 15/0826
See application file for complete search history.

(56) References Cited

U.S. PATENT DOCUMENTS

| 2,569,625 | A | | 10/1951 | Wyllie | |
|---|---|---|---|---|---|
| 4,322,680 | A | * | 3/1982 | Janata | G01N 27/414 324/71.2 |
| 4,483,748 | A | * | 11/1984 | Yeager | G01N 27/40 204/406 |
| 4,586,376 | A | * | 5/1986 | Outmans | E21B 49/00 73/38 |
| 5,452,233 | A | | 9/1995 | Jachowicz et al. | |
| 5,493,226 | A | * | 2/1996 | Honarpour | E21B 49/005 324/376 |
| 6,463,790 | B1 | | 10/2002 | Chun et al. | |

(Continued)

FOREIGN PATENT DOCUMENTS

| CN | 106018237 A | 10/2016 |
|---|---|---|
| CN | 206996028 U | 2/2018 |

(Continued)

OTHER PUBLICATIONS

Bendik Horvei, "Streaming potential—qualification of method and investigating the impact of brine in sandstone core plugs", University of Stavanger, May 15, 2017. (Year: 2017).*

(Continued)

*Primary Examiner* — David A. Rogers
(74) *Attorney, Agent, or Firm* — Osha Bergman Watanabe & Burton LLP

(57) ABSTRACT

A system to measure a streaming potential of a core plug includes a measurement cell having a chamber to hold the core plug and an inlet fluid line connected to an inlet port of the measurement cell. A filtration device is arranged to control a salinity and ionic strength of a liquid medium received in the chamber through the inlet fluid line. The filtration device has membrane filters with different ion rejection rates and is controllable to selectively dispose each of the membrane filters in the inlet fluid line.

20 Claims, 3 Drawing Sheets

(56) References Cited

U.S. PATENT DOCUMENTS

| | | | | |
|---|---|---|---|---|
| 7,987,907 | B2* | 8/2011 | Collins | C09K 8/58 |
| | | | | 166/252.3 |
| 8,129,691 | B2* | 3/2012 | Hu | G01N 1/02 |
| | | | | 250/390.01 |
| 8,486,269 | B2* | 7/2013 | McGuire | B01J 49/53 |
| | | | | 210/670 |
| 8,946,130 | B2* | 2/2015 | Zamora | C09K 8/68 |
| | | | | 507/236 |
| 9,261,435 | B2* | 2/2016 | Collins | G01N 1/00 |
| 9,316,572 | B2* | 4/2016 | Benet | G01N 3/08 |
| 9,790,417 | B1* | 10/2017 | Jiang | C09K 8/035 |
| 9,804,062 | B2* | 10/2017 | Collins | G01N 15/082 |
| 10,041,339 | B2* | 8/2018 | Jerauld | E21B 43/16 |
| 10,227,858 | B2* | 3/2019 | Collins | G05B 17/02 |
| 10,301,532 | B2* | 5/2019 | Mahadevan | E21B 43/16 |
| 10,443,363 | B2* | 10/2019 | Canalizo-Hernandez | |
| | | | | E21B 43/20 |
| 10,457,855 | B2* | 10/2019 | Mahmoud | C01F 11/462 |
| 10,712,028 | B2* | 7/2020 | Su | F24F 13/28 |
| 10,712,253 | B2* | 7/2020 | Su | G01N 15/082 |
| 11,047,789 | B2* | 6/2021 | Guo | G01N 15/082 |
| 2008/0067125 | A1 | 3/2008 | Wilkins et al. | |
| 2012/0267307 | A1 | 10/2012 | McGinnis | |
| 2013/0098839 | A1 | 4/2013 | Helm, Jr. | |
| 2013/0206689 | A1 | 8/2013 | Gibson Juby et al. | |
| 2014/0042058 | A1 | 2/2014 | Janssen et al. | |
| 2014/0290484 | A1 | 10/2014 | Weston et al. | |
| 2017/0050866 | A1 | 2/2017 | Ganzi et al. | |
| 2019/0055841 | A1 | 2/2019 | Brady et al. | |
| 2021/0270714 | A1* | 9/2021 | Cha | G01V 3/22 |

FOREIGN PATENT DOCUMENTS

| | | | |
|---|---|---|---|
| CN | 111024587 A * | 4/2020 | |
| WO | 2003042688 A2 | 5/2003 | |
| WO | 2018091273 A1 | 5/2018 | |
| WO | 2019204048 A1 | 10/2019 | |

OTHER PUBLICATIONS

Luong Duy Thanh et al., Zeta Potential Measurement Using Streaming Potential in Porous Media, VNU Journal of Science: Mathematics—Physics, vol. 31, No. 4., 2015. (Year: 2015).*

E. Walker et al., "A transient method for measuring the DC streaming potential coefficient of porous and fractured rocks", Journal of Geophysical Research: Solid Earth, Feb. 15, 2014. (Year: 2014).*

Jun Wang et al., "Electrokinetic experimental study on saturated rock samples: zeta potential and surface conductance", Geophysical Journal International, No. 201, 2015. (Year: 2015).*

Rahbar, M. et al. "Predicting the Rock Wettability Changes Using Solutions with Different pH through Streaming Potential Measurement", Journal of Petroleum Science and Engineering 167 (2018) 20-27 (8 pages).

Peeters, J.M.M. et al. "Streaming Potential Measurements as a Characterization Method for Nanofiltration Membranes", Colloids and Surfaces A: Physiochemical and Engineering Aspects, 150 (1999) 247-259 (13 pages).

Sadeqi-Moqadam, M. et al. "Monitoring Wettability Alteration of Porous Media by Streaming Potential Measurements; Experimental and Modeling Investigation", Colloids and Surfaces A: Physiochemical and Engineering Aspects, 487 (2016) 182-193 (12 pages).

Vinogradov, J. et al. "Measurement of Streaming Potential Coupling Coefficient in Sandstones Saturated with Natural and Artificial Brines at High Salinity", Journal of Geophysical Research, 115 (2010) B12204 (6 pages).

Jiuyang Lin et al, "Fractionation of direct dyes and salts in aqueous solution using loose nanofiltration membranes" Journal of Membrane Science, 2015, 477, 183-193 (11 pages).

International Search Report and Written Opinion issued in corresponding International Application No. PCT/US2020/026860, dated Dec. 2, 2020 (12 pages).

* cited by examiner

SYSTEM AND METHOD FOR DYNAMIC MEASUREMENT OF STREAMING POTENTIAL IN A CORE PLUG

FIELD

The disclosure relates generally to measurement of streaming potential in porous bodies.

BACKGROUND

In secondary recovery of oil or gas from a reservoir, fluid is injected into the reservoir to maintain pressure in the reservoir and displace the oil or gas contained in the reservoir toward the wellbore. One common injection fluid is brine, which is typically in the form of seawater or freshwater. More recently, there has been interest in increasing the yield of secondary recovery through modification of the composition of the injected brine. Surface charge alteration due to contact between the brine and rock has been investigated as one possible mechanism that could be exploited to achieve enhanced secondary recovery.

Zeta potential is a key technique for measuring surface charges. Zeta potential is the electrostatic potential that develops when a surface comes into contact with a liquid medium. During such contact, the functional groups on the surface will react with the surrounding liquid medium, which would result in a surface charge that attracts counterions. These counterions arrange themselves into what is known as an electrical double layer. The electrical double layer is made of an inner layer (also called a fixed layer or Stern layer), where the ions are adsorbed onto the surface due to chemical interactions, and an outer layer (also called diffuse layer), where the ions are attracted to the surface charge via electrostatic force. In the diffuse layer, ions are free to move in the liquid medium under the influence of electric attraction and thermal motion. There is a slipping plane at some distance from the surface that separates mobile liquid from liquid that remains attached to the surface. Zeta potential is the electrical potential at this plane.

Zeta potential may be obtained from streaming potential measurements. In general, when a liquid medium (e.g., brine) is forced through a porous body (e.g., a rock sample) by an applied pressure, an electrostatic potential difference is generated along the flow path due to the convective flow of counterions in the liquid medium. This electrostatic potential difference is called streaming potential and can be measured. Zeta potential that develops between the porous body and liquid may be determined from streaming potential by Helmholtz-Smoluchowski equation:

$$\zeta = \frac{U_s \eta k_e}{\varepsilon_0 \varepsilon_r \Delta P} \quad (1)$$

where $\zeta$ is zeta potential, $U_s$ is streaming potential, $\eta$ is dynamic viscosity of the liquid, $k_e$ is specific conductivity of the bulk liquid, $\varepsilon_0$ is electrical permittivity of vacuum, $\varepsilon_r$ is relative permittivity of the liquid, and $\Delta P$ is pressure difference across the porous body.

By forcing brine with different compositions through a rock sample, it is possible to obtain a streaming potential for each brine composition and determine the corresponding zeta potential. However, conventional streaming potential instruments do not allow dynamic control of the brine composition during streaming potential measurements.

SUMMARY

A system to measure a streaming potential may be summarized as including a measurement cell comprising a core holder having a chamber defined therein, a first port through which the chamber can receive a liquid medium, a second port through which the liquid medium can leave the chamber, a pair of electrodes positioned to measure an electrical potential between opposing ends of the chamber; a first fluid line connected to the first port to provide the liquid medium to the first port; a second fluid line connected to the second port to receive the liquid medium from the second port; a filtration device having a plurality of membrane filters with different ion rejection rates, the filtration device having at least one member that is controllable to selectively dispose each of the membrane filters in the first fluid line such that a flow direction of the membrane filter that is disposed in the first fluid line is aligned with a flow direction of the first fluid line, whereby the membrane filter having the flow direction that is aligned with the flow direction of the first fluid line adjusts a salinity and an ionic strength of the liquid medium passing through the first fluid line to the first port; and an electrical circuit connected to the pair of electrodes to measure the electrical potential across the pair of electrodes.

In some cases, the membrane filters are nanofiltration membranes.

In some cases, the nanofiltration membranes reject NaCl in a range from 15% to 90%.

In some cases, the at least one member includes a support plate having a plurality of slots, and the plurality of membrane filters are disposed in at least a portion of the plurality of slots.

In some cases, at least one of the plurality of slots does not contain a membrane filter, and the at least one member is controllable to selectively align a flow direction of the slot that does not contain a membrane filter with the flow direction of the first fluid line.

In some cases, the support plate is rotatably supported, and the flow direction of each of the membrane filters is selectively aligned with the flow direction of the first fluid line by rotation of the support plate.

In some cases, the support plate has a disk shape, and the membrane filters are in a circular arrangement on the support plate.

In some cases, the system includes an actuator that is coupled to the support plate and operable to rotate the support plate.

In some cases, the system further includes a control system to receive a selection of ion rejection rate and operate the actuator to rotate the support plate to a position in which the flow direction of the membrane filter having the selection of ion rejection rate is aligned with the flow direction of the first fluid line.

In some cases, the system includes another pair of electrodes to measure a conductivity of the liquid medium received in the chamber.

In some cases, the system includes pressure transducers to measure the fluid pressure in the first and second fluid lines.

In some cases, the system includes a first reservoir connected to the first fluid line, the first reservoir to supply the liquid medium to the first fluid line.

In some cases, the system includes a pump that is operable to create a pressure gradient between the first and second fluid lines to drive the liquid medium from the first fluid line through the chamber to the second fluid line.

In some cases, the pump is connected to apply a pressure to the liquid medium in the first reservoir.

In some cases, the system includes a second reservoir connected to the second fluid line, the second reservoir to receive the liquid medium from the second fluid line.

A method of measuring a streaming potential of a core plug may be summarized as including supporting the core plug in a chamber that is fluidly connected to a first fluid line and a second fluid line; driving a liquid medium from the first fluid line, through the core plug in the chamber, to the second fluid line for a time period; and measuring an electrical potential across a pair of electrodes positioned in contact with the liquid medium at opposing ends of the core plug. During at least a portion of the time period, at least one membrane filter is selected from among a plurality of membrane filters having different ion rejection rates, and a flow direction of the at least one membrane filter is aligned with a flow direction of the first fluid line, whereby the at least one membrane filter adjusts a salinity and an ionic content of the liquid medium driven through the core plug.

In some cases, the method includes selecting each of the membrane filters from among the plurality of membrane filters at different times and aligning a flow direction of each selected membrane filter with the flow direction of the first fluid line, whereby the selected membrane filter adjusts the salinity and the ionic content of the liquid medium driven through the core plug.

In some cases, selecting at least one membrane filter from among a plurality of membrane filters having different ion rejection rates includes selecting at least one nanofiltration membrane from among a plurality of nanofiltration membranes having different ion rejection rates.

In some cases, the method includes measuring a pressure differential between the first and second fluid lines.

In some cases, the method includes measuring a conductivity of the liquid medium driven through the core plug.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
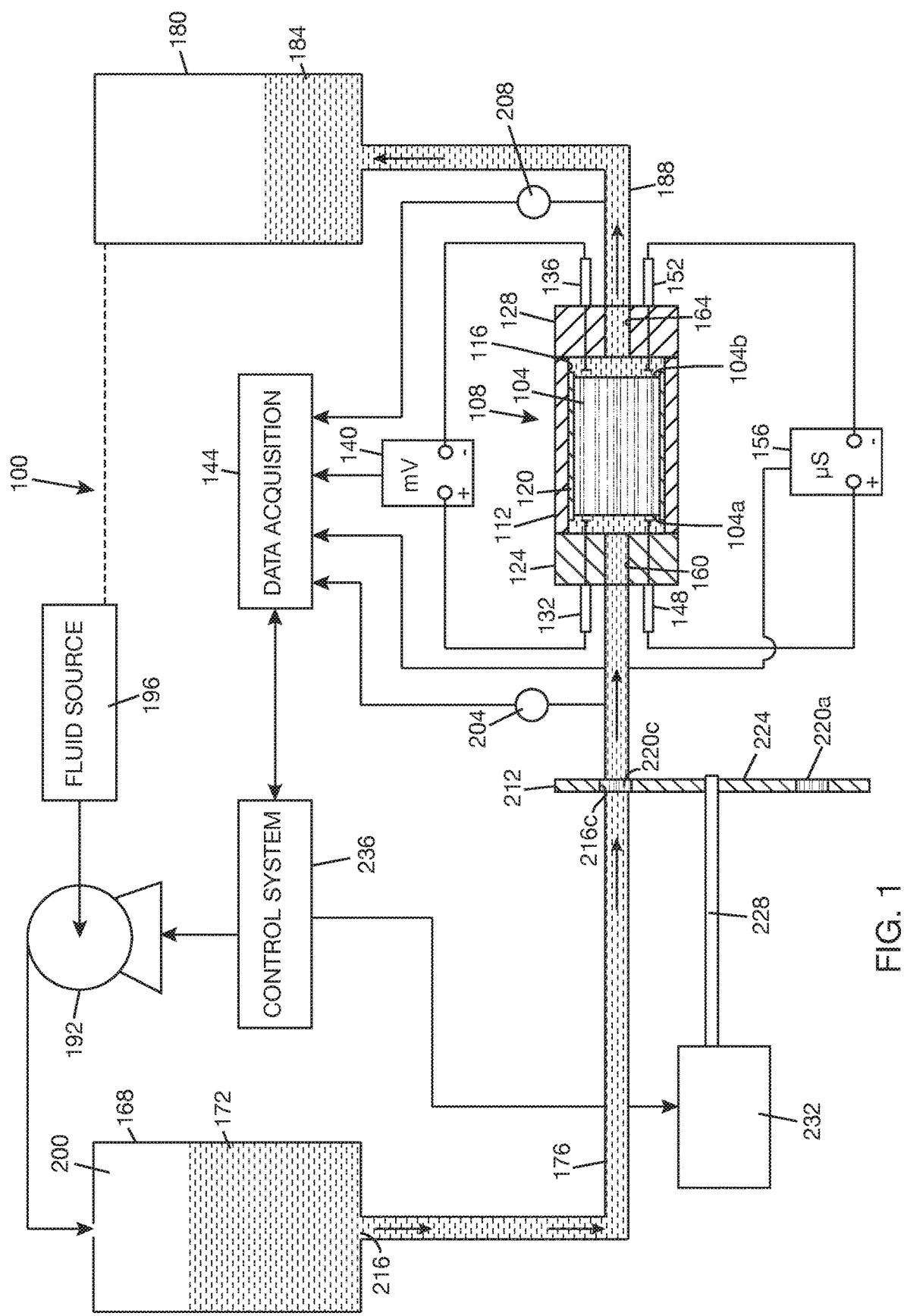
FIG. 1 is a schematic diagram of a system for measuring streaming potential in a core plug according to one implementation.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes have not been shown or described in detail to avoid unnecessarily obscuring descriptions of the implementations and embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

FIG. 1 is a schematic diagram of one implementation of a system 100 for measuring streaming potential in a core plug 104. The term "core plug" as used herein will generally refer to a porous body in the general shape of a cylinder. In the oil and gas field, a core plug is a sample of rock in the general shape of a cylinder. Typically, a cylindrical rock sample is taken from the side of a drilled oil or gas well using a core bit and then cut into multiple pieces, each of which forms a core plug. A core plug produced in this manner may be about 1 inch in diameter and about 3 inches in length, although system 100 is not restricted to any particular size of core plug.

System 100 includes a measurement cell 108, which includes a core holder 112 having an internal chamber 116. Core holder 112 may be, for example, a hollow cylindrical body made of a material that is resistant to corrosion, such as stainless steel. Core plug 104 is disposed within chamber 116. In some cases, core plug 104 may be disposed in a protective sleeve 120 inside chamber 116, in which case protective sleeve 120 forms a separation layer between core plug 104 and the wall of core holder 112. Protective sleeve 120 may be made of a polymer or other electrically insulating material. Measurement cell 108 includes end caps 124, 128 mounted at opposite ends of core holder 112. Chamber 116 extends between end caps 124, 128.

In one example, end caps 124, 128 include ports 160, 164, respectively, through which liquid may flow into and out of chamber 116. Each of ports 160, 164 may be a single through-hole or multiple through-holes or a porous section of end caps 124, 128. However, measurement cell 108 is not limited to ports 160, 164 in end caps 124, 128. For example, ports may be provided in the wall of core holder 112 at locations proximate end caps 124, 128. For discussion purposes, a flow direction from end cap 124 to end cap 128 may be assumed. In this case, port 160 may be referred to as an "inlet port", and port 164 may be referred to as an "outlet port". The portion of chamber 116 adjacent to and in communication with inlet port 160 may be referred to as the inlet end of chamber 116. The portion of chamber 116 adjacent to and in communication with outlet port 164 may be referred to as the outlet end of chamber 116.

Figure 2:
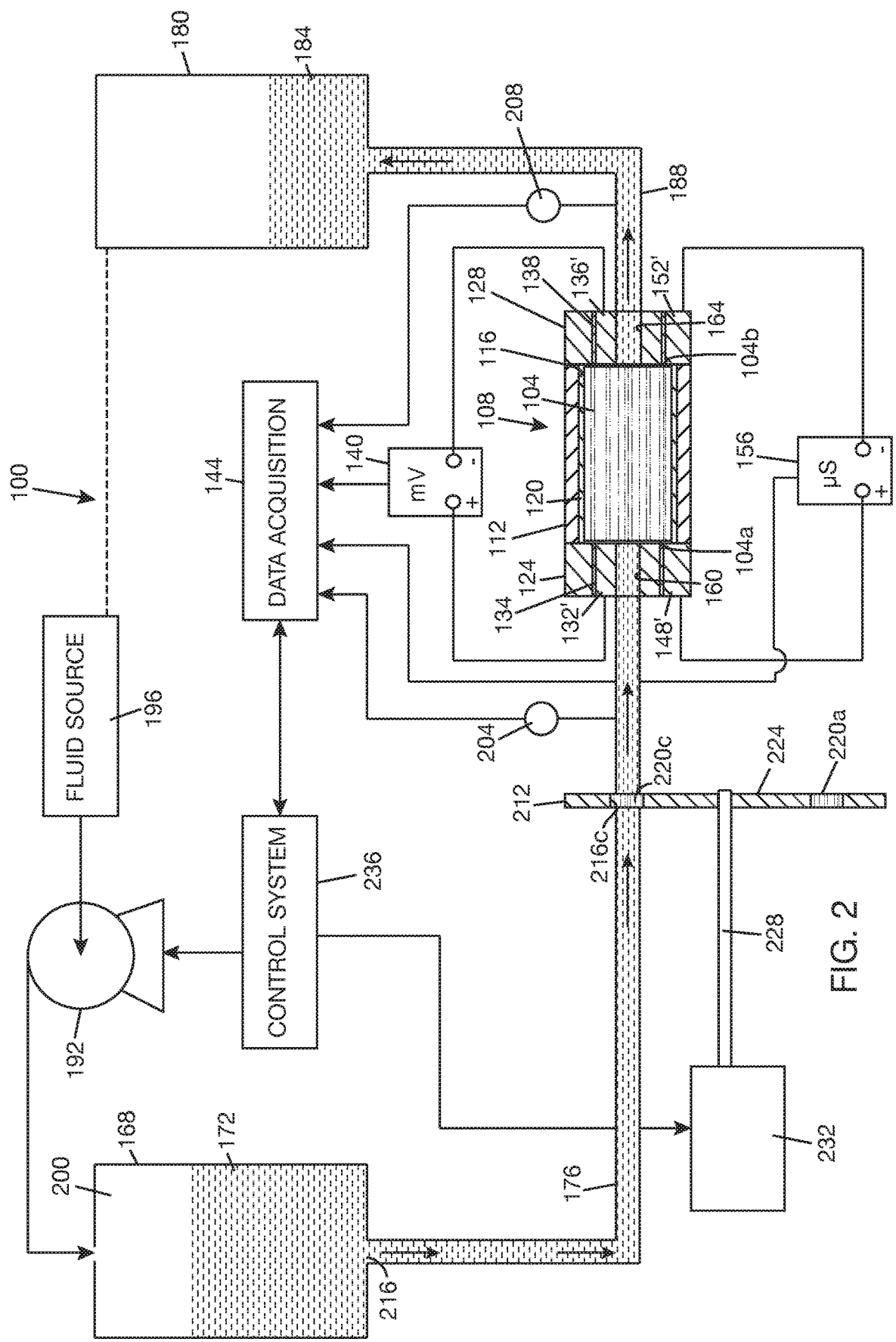
FIG. 2 shows the system of FIG. 1 with an alternative measurement electrode arrangement.

Measurement cell 108 includes electrodes 132, 136 to measure streaming potential. Electrodes 132, 136 may be, but are not limited to, Ag/AgCl electrodes. Electrodes 132, 136 are positioned to measure an electrical potential between opposing ends of chamber 120 (or between opposing end faces 104*a*, 104*b* of core plug 104 within chamber 120). In the illustrated implementation, electrodes 132, 136 are carried by end caps 124, 128, respectively. In the illustrated implementation, electrodes 132, 136 extend into chamber 116 and are in contact with the liquid medium at opposing ends of core plug 104. Although not shown, electrodes 132, 136 could contact end faces 104*a*, 104*b* of core plug 104. However, other arrangements of electrodes to measure streaming potential are possible. For example, end caps 124, 128 may be replaced with electrodes. For example, FIG. 2 shows alternative electrodes 132',136' positioned at the ends of core holder 112. Electrodes 132',136' are ring electrodes in this example. In this case, electrodes 132',136' can be positioned proximate or in contact with end faces 104*a*, 104*b*, respectively, of core plug 104. (Ports 160, 164 may run through the center of electrodes 132',136'.) In general, it suffices that there is a conductive path between a first electrode, e.g., electrode 132' (132 in FIG. 1), and the inlet end face 104*a* of core plug 104 and a conductive path between a second electrode, e.g., electrode 136' (136 in FIG. 1), and the outlet end face 104*b* of core plug 104.

Returning to FIG. 1, an electrical circuit 140 is connected across electrodes 132, 136 to measure the potential difference between electrodes 132, 136 when fluid is driven through core plug 104. Electrical circuit 140 may be a voltmeter or other suitable electrical circuit for measuring potential difference. The output of electrical circuit 140 may be received at a data acquisition system 144.

Measurement cell 108 may also include electrodes 148, 152 to measure conductivity of fluid driven through core plug 104. Electrodes 148, 152 may be, but are not limited to, Pt electrodes. The relationship between electrodes 148, 152 may be generally the same as described for electrodes 132, 136 above. FIG. 2 also shows alternative electrodes 148', 152' positioned at the ends of core holder 112. Electrodes 148',152' may be concentric with electrodes 132',136' respectively. Insulating material 134, 138 may be disposed between electrodes 132',148' and 136',152', respectively. Returning to FIG. 1, a conductivity meter 156 is connected across electrodes 148 (148' in FIG. 2), 152 (152' in FIG. 2). The output of conductivity meter 156 may be received at data acquisition system 144. In one example, salinity of fluid driven through core plug 104 may be derived from the conductivity measurements outputted by conductivity meter 156. This may allow the streaming potential measured by electrodes 132, 136 to be associated with a salinity value.

System 100 includes an inlet reservoir 168 that holds a column 172 of liquid electrolyte (or brine). An inlet fluid line 176 connects inlet reservoir 168 to inlet port 160 of measurement cell 108 and forms a conduit for transferring liquid electrolyte from inlet reservoir 168 to chamber 116. System 100 may include an outlet reservoir 180 that holds a column 184 of liquid electrolyte. An outlet fluid line 188 connects outlet port 164 of measurement cell 108 to outlet reservoir 180 and forms a conduit for transferring liquid electrolyte from chamber 116 to outlet reservoir 180. In general, the heights of liquid columns 172, 184 will vary during streaming potential measurement. It is possible to omit outlet reservoir 180 and simply allow fluid in outlet fluid line 188 to drain out.

System 100 may include means of providing a pressure gradient to drive liquid electrolyte from inlet fluid line 176 to outlet fluid line 188 through core plug 104. In one example, the drive means may be a pump 192 that is operable to apply pressure to the liquid column 172 in inlet reservoir 168 by pumping fluid from a source 196 into a volume 200 above liquid column 172. The fluid pumped into inlet reservoir 168 by pump 192 may have the same characteristics as the liquid electrolyte in fluid column 172 or may be a fluid that is less dense than the liquid electrolyte in fluid column 172, e.g., an inert gas such as nitrogen or a liquid medium such as oil. It is possible to form a fluid connection between outlet reservoir 180 and fluid source 196 such that fluid in a volume above fluid column 184 drains into fluid source 196.

Pressure transducers 204, 208 may be disposed in fluid lines 176, 188 to measure the fluid pressure in these lines. The pressure readings may be received at data acquisition system 144. The pressure readings may be used both for controlling the pressure gradient that drives the liquid electrolyte through core plug 104 and for determining zeta potential from the streaming potential measurements.

System 100 includes means for controlling the salinity and ionic strength of the liquid electrolyte driven through core plug 104. In one illustrative implementation, the salinity/ionic strength control includes a filtration device 212 positioned in inlet fluid line 176, which means that liquid electrolyte passing through inlet fluid line 176 at some point passes through filtration device 212 and is thereby processed by filtration device 212. Filtration device 212 may be positioned anywhere between outlet end 216 of inlet reservoir 168 and inlet port 160 of measurement cell 108. By adjusting the filtering function at filtration device 212, it is thus possible to measure the effect of varying degrees of salinity and ionic strength of the liquid electrolyte on streaming potential and zeta potential in core plug 104 without changing the composition of the liquid electrolyte that is supplied to inlet reservoir 168 (i.e., the liquid electrolyte in column 172).

Figure 3:
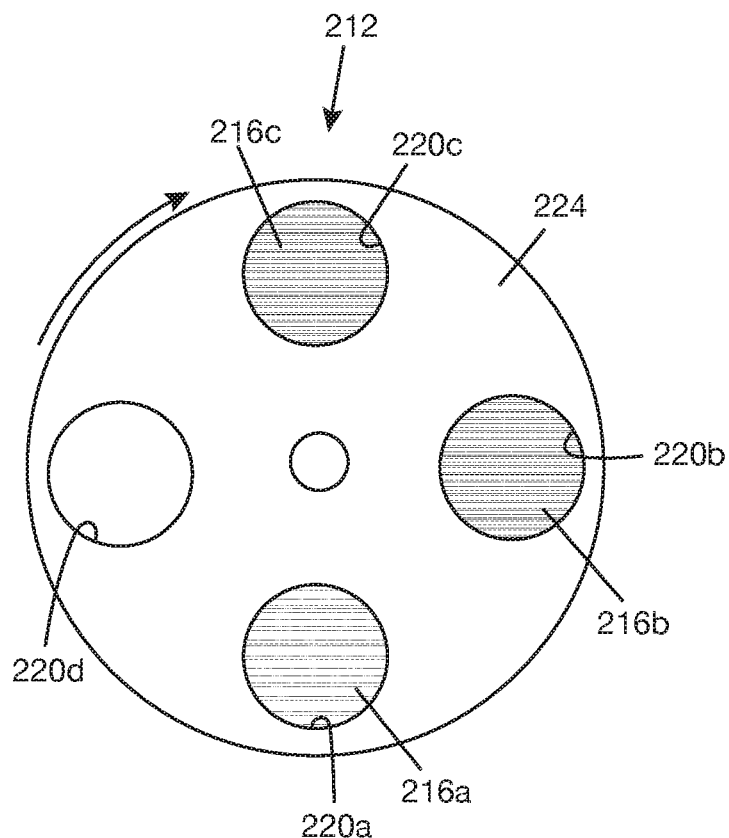
FIG. 3 is a schematic diagram of a filtration device according to one implementation.

FIG. 3 shows one implementation of filtration device 212. In FIG. 3, filtration device 212 includes membrane filters 216*a*, 216*b*, 216*c* carried in slots 220*a*, 220*b*, 220*c* formed in a support plate 224. Support plate 224 may have additional slots (e.g., slot 220*d*) that do not carry a membrane filter or that carry a porous media that does not act as a membrane filter. Support plate 224 is shown as having four slots. However, support plate 224 may have more or less than four slots. Also, filtration device 212 is shown as having three membrane filters. However, filtration device 212 may have more or less than three membrane filters. In general, filtration device 212 has at least one membrane filter. Preferably, filtration device 212 has plural membrane filters with different ion rejection rates (or different filtration characteristics). In the example shown in FIG. 3, support plate 224 has a disk shape, and slots 220*a-d* are arranged in a circular pattern. This means that the membrane filters are also arranged in a circular pattern. However, the filtration device 212 is not restricted to membrane filters arranged in a circular pattern.

Preferably, the membrane filters 216*a*, 216*b*, 216*c* are nanofiltration membranes. The pore size of the nanofiltration membranes may be in a range from 0.1 nm to 10 nm. Nanofiltration membranes in sheet or flat form may be used. Nanofiltration membranes allow water and varying degrees of monovalent ions to pass through while rejecting multivalent ions. In one non-limiting example, filtration device 212 may use nanofiltration membranes having NaCl rejection rates in a range from 10% to 95%. In one non-limiting example, nanofiltration membranes with NaCl rejection rates of 15%, 45%, and 90% may be used as membrane filters 216a, 216b, 216c, respectively. The membrane filters may be arranged in a defined sequence on support plate 224, e.g., in increasing or decreasing order of ion rejection rates.

Each slot 220a, 220b, 220c, 220d defines a flow path through filtration device 212. Thus, filtration device 212 has plural separated flow paths. At least some of the flow paths have a positive filtering function provided by a membrane filter, which may be a nanofiltration membrane. In the example of FIG. 3, the flow paths associated with slots 220a, 220b, 220c have positive filtering functions due to the presence of membrane filters 216a, 216b, 216c, respectively. The flow path associated with slot 220d has a zero filtering function due to lack of a membrane filter. In use, a selected one of the flow paths (slots) can be aligned with inlet fluid line 176, as shown in FIG. 1. FIG. 1 shows that the flow path that is currently aligned with inlet fluid line 176 contains membrane filter 220c. In this case, the flow direction of membrane filter 220c is aligned with the flow direction of inlet fluid line 176. The fluid passing through inlet fluid line 176 will thus be able to pass through and be filtered by membrane filter 220c.

A mechanism may be provided to adjust the position of filtration device 212 such that a desired flow path/membrane filter in filtration device 212 can be aligned with inlet fluid line 176. As an example, support plate 224 may be coupled to an output shaft 228 of a motor 232. Motor 232 may receive a control signal from a control system 236 to rotate support plate 224 by some amount, e.g., by 90 degrees, in order to position another membrane filter in inlet fluid line 176. Control system 236 may be a computer system (or controller) that can communicate with motor 232 and data acquisition system 144. Control system 236 may receive a selection of an ion rejection rate or membrane filter, e.g., through a user interface or from an application program, and generate an appropriate control signal to motor 232. In general, any method of adjusting the position of support plate 224 relative to inlet fluid line 176, including manual methods, may be used.

A method of measuring streaming potential may include supporting core plug 104 in chamber 116 of measurement cell 108. The method may further include creating a pressure gradient that drives liquid electrolyte from inlet fluid line 176 to outlet fluid line 188 through core plug 104. The outputs of electrical circuit 140, conductivity meter 156, and pressure transducers 204, 208 are received and recorded at data acquisition system 144. Streaming potential measurements may be initially made with filtration device 212 providing zero filtration function. Then, a control signal may be sent from control system 236 to motor 232 to rotate the support plate 224 to a position in which a selected membrane filter is aligned with inlet fluid line 176. Filtration device 212 will provide a positive filtration function in this new position, i.e., the liquid electrolyte that passes through the selected membrane filter will have a modified salinity and ionic strength. Streaming potential measurements can be made at this modified salinity and ionic strength. Then, support plate 224 can be adjusted again to align another membrane filter with inlet fluid line 176. The method may include sequentially moving through all the membrane filters in filtration device 212 or just a select number of the membrane filters in filtration device 212. At the end of the method, there will be streaming potential measurement data captured at various salinities and ionic strengths. These measurement data can be used to determine zeta potential at various salinities and ionic strengths. All the streaming potential measurement data at various salinities and ionic strengths can be captured without changing the composition of the liquid electrolyte fed into inlet reservoir 168.

Figure 4:
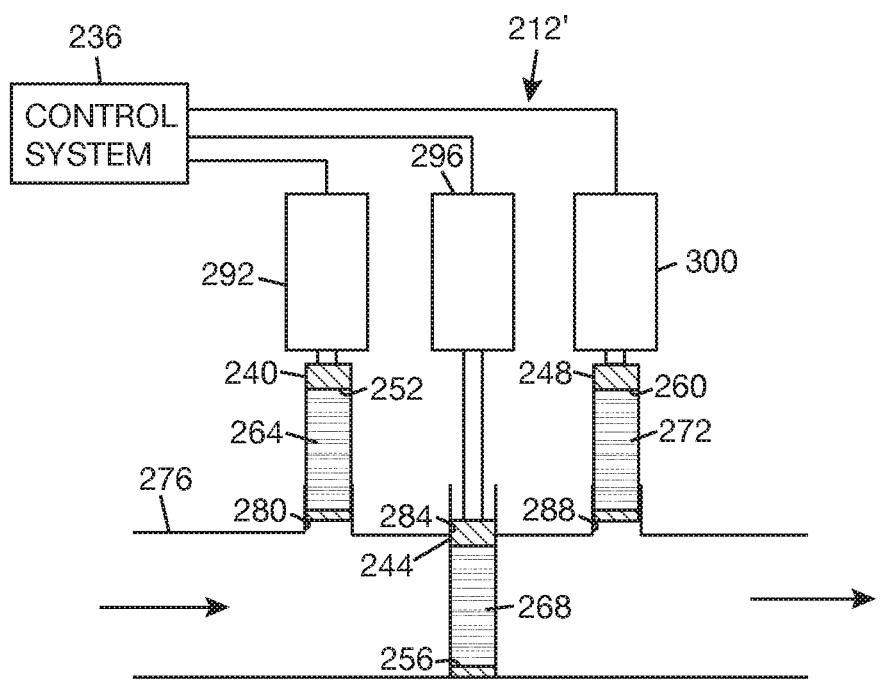
FIG. 4 is a schematic diagram of a filtration device according to another implementation.

FIG. 4 shows another filtration device 212' that may be used in system 100 to control salinity and ionic strength. Filtration device includes support plates 240, 244, 248, each of which has a slot 252, 256, 260, respectively. Membrane filters 264, 268, 272 are carried in respective slots 252, 256, 260—any suitable means of attaching membrane filters to support plates such that they are positioned in slots may be used. Membrane filters 264, 268, 272 may be nanofiltration membranes as previously described. Support plates 240, 244, 248 may be arranged in generally parallel spaced-apart relation. Filtration device 212' includes a conduit 276 that may be aligned with the inlet fluid line (176 in FIG. 1). Conduit 276 has a series of wall openings 280, 284, 288. Support plates 240, 244, 248 are aligned with the openings 280, 284, 288, respectively. Actuators 292, 296, 300 are coupled to support plates 240, 244, 248, respectively. Each of actuators 292, 296, 300 may be operated to extend a respective support plate 240, 244, 248 into conduit 276 or withdraw a respective support plate 240, 244, 248 from the conduit. For illustration purposes, support plate 244 is shown in an extended position. In this position, the flow-through direction of membrane filter 268 is aligned with the flow direction of conduit 276. When conduit 276 is disposed in the inlet fluid line (176 in FIG. 1), the liquid electrolyte passing through the inlet fluid line will at some point pass through membrane filter 268, resulting in a liquid electrolyte with an adjusted salinity and ionic strength that is received at the inlet port (160 in FIG. 1) of the measurement cell. Actuators 292, 296, 300 may receive control signals from control system 236 (also shown in FIG. 1) during streaming potential measurement. Filtration device 212' may be used in the method and system (FIGS. 1 and 2) described above in place of filtration device 212.

While the invention has been described with respect to a limited number of embodiments, those skilled in the art, having the benefit of this disclosure, will appreciate that other embodiments can be devised that do not depart from the scope of the invention as described herein. Accordingly, the scope of the invention should be limited only by the accompanying claims.

What is claimed is:

1. A system to measure streaming potential of a core plug, the system comprising:
   a measurement cell comprising a core holder having a chamber defined therein, a first port through which the chamber can receive a liquid medium, a second port through which the liquid medium can leave the chamber, a pair of electrodes positioned to measure an electrical potential between opposing ends of the chamber;
   a first fluid line connected to the first port to provide the liquid medium to the first port;
   a second fluid line connected to the second port to receive the liquid medium from the second port;
   a filtration device having a plurality of membrane filters with different ion rejection rates, the filtration device having at least one member that is controllable to selectively dispose each of the membrane filters in the first fluid line such that a flow direction of the membrane filter that is disposed in the first fluid line is aligned with a flow direction of the first fluid line, whereby the membrane filter having the flow direction that is aligned with the flow direction of the first fluid line adjusts a salinity and an ionic strength of the liquid medium passing through the first fluid line to the first port; and an electrical circuit connected to the pair of electrodes to measure the electrical potential across the pair of electrodes.

2. The system of claim 1, further comprising another pair of electrodes to measure a conductivity of the liquid medium received in the chamber.

3. The system of claim 1, wherein the membrane filters are nanofiltration membranes.

4. The system of claim 3, wherein the nanofiltration membranes reject NaCl in a range from 15% to 90%.

5. The system of claim 3, wherein the at least one member comprises a support plate having a plurality of slots, and wherein the plurality of membrane filters are disposed in at least a portion of the plurality of slots.

6. The system of claim 5, wherein at least one of the plurality of slots does not contain a membrane filter, and wherein the at least one member is controllable to selectively align a flow direction of the slot that does not contain a membrane filter with the flow direction of the first fluid line.

7. The system of claim 5, wherein the support plate is rotatably supported, and wherein the flow direction of each of the membrane filters is selectively aligned with the flow direction of the first fluid line by rotation of the support plate.

8. The system of claim 7, wherein the support plate has a disk shape, and wherein the membrane filters are in a circular arrangement on the support plate.

9. The system of claim 7, further comprising an actuator coupled to the support plate and operable to rotate the support plate.

10. The system of claim 9, further comprising a control system to receive a selection of ion rejection rate and operate the actuator to rotate the support plate to a position in which the flow direction of the membrane filter having the selection of ion rejection rate is aligned with the flow direction of the first fluid line.

11. The system of claim 1, further comprising pressure transducers to measure the fluid pressure in the first and second fluid lines.

12. The system of claim 11, further comprising a first reservoir connected to the first fluid line, the first reservoir to supply the liquid medium to the first fluid line.

13. The system of claim 12, further comprising a second reservoir connected to the second fluid line, the second reservoir to receive the liquid medium from the second fluid line.

14. The system of claim 12, further comprising a pump operable to create a pressure gradient between the first and second fluid lines that drives the liquid medium from the first fluid line through the chamber to the second fluid line.

15. The system of claim 14, wherein the pump is connected to apply a pressure to the liquid medium in the first reservoir.

16. A method of measuring a streaming potential of a core plug, the method comprising:
supporting the core plug in a chamber that is fluidly connected to a first fluid line and a second fluid line;
driving a liquid medium from the first fluid line, through the core plug in the chamber, to the second fluid line for a time period;
during at least a portion of the time period:
selecting a first membrane filter from among a plurality of membrane filters having different ion rejection rates; and
aligning a flow direction of the first membrane filter with a flow direction of the first fluid line, whereby the first membrane filter adjusts a salinity and an ionic content of the liquid medium driven through the core plug;
thereafter selecting a second membrane filter from among the plurality of membrane filters; and
aligning a flow direction of the second membrane filter with the flow direction of the first fluid line, whereby the second membrane filter adjusts the salinity and the ionic content of the liquid medium driven through the core plug; and
measuring an electrical potential across a pair of electrodes positioned in contact with the liquid medium at opposing ends of the core plug.

17. The method of claim 16, further comprising measuring a pressure differential between the first and second fluid lines.

18. The method of claim 16, further comprising measuring a conductivity of the liquid medium driven through the core plug.

19. A method of measuring a streaming potential of a core plug, the method comprising:
supporting the core plug in a chamber that is fluidly connected to a first fluid line and a second fluid line;
driving a liquid medium from the first fluid line, through the core plug in the chamber, to the second fluid line for a time period;
during at least a portion of the time period:
selecting, at different times, each membrane filter from among a plurality of membrane filters having different ion rejection rates; and
aligning a flow direction of each selected membrane filter with a flow direction of the first fluid line, whereby the selected membrane filter adjusts a salinity and an ionic content of the liquid medium driven through the core plug; and
measuring an electrical potential across a pair of electrodes positioned in contact with the liquid medium at opposing ends of the core plug.

20. The method of claim 19, wherein selecting each membrane filter from among a plurality of membrane filters having different ion rejection rates comprises selecting at least one nanofiltration membrane from among a plurality of nanofiltration membranes having different ion rejection rates.

* * * * *